United States Patent
Markusic

(10) Patent No.: US 9,260,076 B2
(45) Date of Patent: Feb. 16, 2016

(54) METHOD, SYSTEM AND APPARATUS FOR STABILIZING VEHICLE OCCUPANT'S SHOULDER DURING SIDE COLLISION IMPACT

(71) Applicant: Honda Motor Co., Ltd., Tokyo (JP)

(72) Inventor: Craig A Markusic, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 13/949,023

(22) Filed: Jul. 23, 2013

(65) Prior Publication Data

US 2015/0028575 A1    Jan. 29, 2015

(51) Int. Cl.
| | |
|---|---|
| *B60R 22/12* | (2006.01) |
| *B60R 22/14* | (2006.01) |
| *B60R 21/18* | (2006.01) |
| *B60R 21/00* | (2006.01) |

(52) U.S. Cl.
CPC .................. *B60R 22/14* (2013.01); *B60R 21/18* (2013.01); *B60R 2021/0006* (2013.01); *B60R 2021/0058* (2013.01)

(58) Field of Classification Search
CPC .. B60R 22/12; B60R 22/14; B60R 2021/0058
USPC ............... 280/808, 801.1, 806, 807; 297/468, 297/483, 486
See application file for complete search history.

(56) References Cited

U.S. PATENT DOCUMENTS

| | | | | |
|---|---|---|---|---|
| 3,774,937 A | * | 11/1973 | Otani ............................. | 297/483 |
| 3,888,503 A | * | 6/1975 | Hamilton ...................... | 280/733 |
| 5,620,231 A | * | 4/1997 | Marker et al. ............. | 297/250.1 |
| 6,082,763 A | * | 7/2000 | Kokeguchi ..................... | 280/733 |
| 6,126,194 A | * | 10/2000 | Yaniv et al. .................... | 280/733 |
| 6,322,149 B1 | | 11/2001 | Conforti et al. | |
| 6,419,263 B1 | | 7/2002 | Büsgen et al. | |
| 7,213,308 B2 | * | 5/2007 | Kobayashi ..................... | 24/633 |
| 7,322,603 B2 | | 1/2008 | Gray et al. | |
| 7,401,815 B2 | * | 7/2008 | Clute ............................ | 280/803 |
| 7,568,726 B2 | * | 8/2009 | Kokeguchi et al. ........... | 280/733 |
| 8,104,790 B2 | | 1/2012 | Nezaki | |
| 2009/0085341 A1 | * | 4/2009 | Suyama et al. ............... | 280/806 |

FOREIGN PATENT DOCUMENTS

| | | |
|---|---|---|
| DE | 3624155 A1 * | 2/1988 |
| JP | 2008247087 A * | 10/2008 |

OTHER PUBLICATIONS

Takeshi Sone, Occupant Restraint System, Oct. 16, 2008, JPO, JP 2008-247087 A, English Abstract.*
Takeshi Sone, Occupant Restraint System, Oct. 16, 2008, JPO, JP 2008-247087 A, Machine Translation of Description.*

* cited by examiner

*Primary Examiner* — James English
(74) *Attorney, Agent, or Firm* — Arent Fox LLP

(57) ABSTRACT

A vehicle occupant restraint method, system, and apparatus. The system includes a seat belt associated with a seat of a vehicle and a shoulder belt portion of the seat belt comprising a shoulder stabilizing zone and a thorax belt portion, wherein the shoulder stabilizing zone includes a larger width dimension than the thorax belt portion. The system also includes a pretensioning device associated with the shoulder belt portion of the seat belt. The pretensioning device is configured to cinch and lock the shoulder stabilizing zone around a shoulder region of the occupant, thereby preventing forward rotation of the shoulder region, in response to a side impact collision.

13 Claims, 8 Drawing Sheets

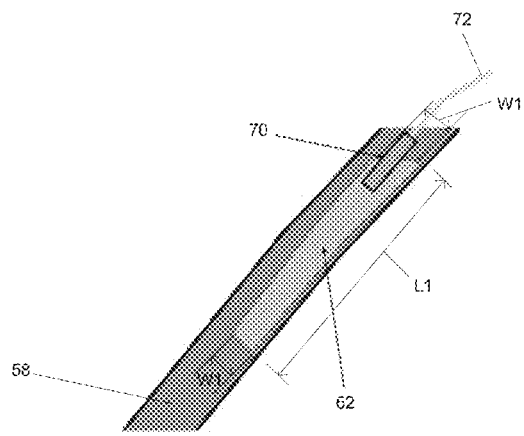
Fig 7A
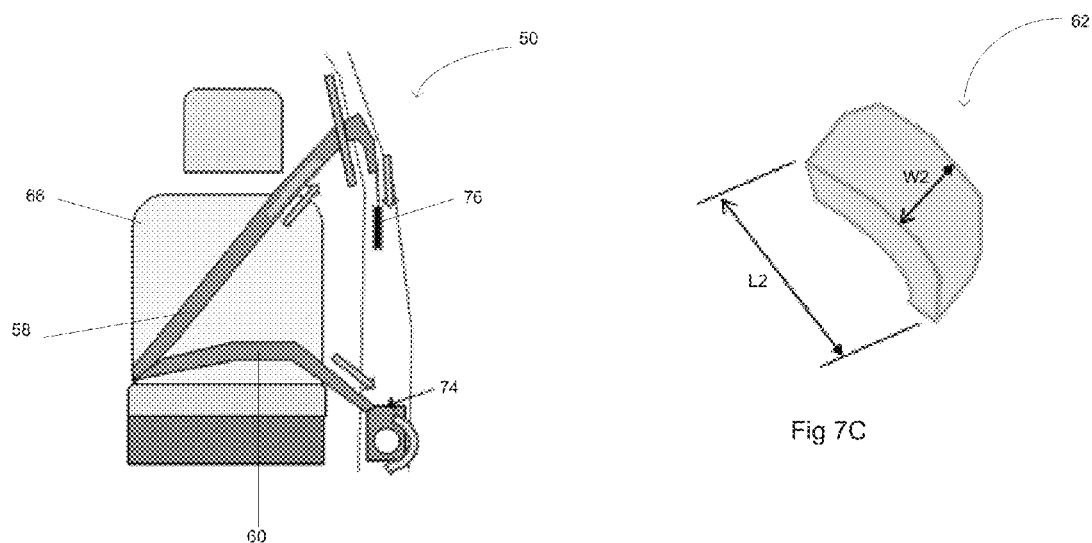
Fig 7B
Fig 7C

METHOD, SYSTEM AND APPARATUS FOR STABILIZING VEHICLE OCCUPANT'S SHOULDER DURING SIDE COLLISION IMPACT

FIELD

The disclosure relates in general to a method, system and apparatus for stabilizing a vehicle occupant's shoulder during a side impact collision and, more particularly, to a device and method that stabilizes an occupant's shoulder to prevent shoulder rotation and provide more protection to the occupant's thorax and abdominal areas during a side impact collision.

BACKGROUND

Seat belts have been standard in vehicles for over fifty years as a safety measure to hold vehicle occupants in place during a quick deceleration or vehicle collision. In that time, additional innovations have been made in seat belt technology, such as the inclusion of locking retractors and pretensioning devices, to further enhance their safety benefits. For example, in the event of a vehicle collision, a pretensioning device will tighten the seat belt almost instantly to reduce motion of the occupant and to help stabilize the occupant in an optimum position within the seat.

Another innovation in seat belt technology includes the use of inflatable seat belts, for example to help distribute collision impact loads in frontal collision events. More specifically, in the event of a collision, a bladder within the seat belt webbing will inflate to increase a surface area that contacts the occupant, thereby spreading the forces pushing against the occupant. Inflation of the bladder also shortens the amount of seat belt tensioning necessary to tighten the belt around the occupant, thus providing a faster reaction time and further reducing unwanted motion of the occupant. Generally, these inflatable bladders are located within the seat belt to be positioned over the occupant's lap or across the occupant's chest.

The above innovations are very beneficial in frontal collision events, where they prevent forward movement and stabilize the occupant's torso against the seatback. However, these and other innovations do little to help stabilize the occupant's shoulders during a side or lateral collision. During a side impact, the most effective load paths through the occupant's body are through the shoulder and the pelvis. However, in the event of a such a side impact, the occupant's shoulder may rotate forward and away from the impact, shifting the impact load path from the shoulder to the more exposed thorax and abdominal areas. Therefore, there is a need for a method and apparatus for stabilizing the occupant's shoulder by restraining the shoulder so that it maintains its load carrying capability during side impact and provides for reduced risk of injury to an occupant's thorax and abdomen during a side collision.

SUMMARY

The disclosure relates in general to a method, system and apparatus for stabilizing an occupant's shoulder during a side impact of a vehicle and, more particularly, to a method for stabilizing an occupant's shoulder during a side impact of a vehicle that limits shoulder rotation and exposure of impact load to thorax and abdominal regions.

In one implementation, the present disclosure is directed to a method of restraining an occupant on a vehicle seat, the method including providing a seat belt associated with the vehicle seat, activating a pretensioning device associated with a lap belt portion of the seat belt and a shoulder belt portion of the seat belt in response to a side impact collision, the shoulder belt portion of the seat belt including a wide shoulder stabilizing zone and a thorax belt portion, the wide shoulder stabilizing zone wider than the thorax belt portion and configured to cover a shoulder region of the occupant. The method further provides for preventing substantial forward rotation of the shoulder region of the occupant by cinching the wide shoulder stabilizing zone of the seat belt about the shoulder region of the occupant with the activated pretensioning device and locking the pretensioning device in place to prevent substantial motion of the shoulder region and a pelvis region of the occupant.

In another implementation, the present disclosure is directed to a vehicle occupant restraint system including a seat belt associated with a seat of a vehicle, a shoulder belt portion of the seat belt comprising a shoulder stabilizing zone and a thorax belt portion, the thorax belt portion for extending across an occupant's thorax, wherein the shoulder stabilizing zone includes a larger width dimension than the thorax belt portion, and a pretensioning device associated with the shoulder belt portion of the seat belt, the pretensioning device configured to cinch and lock the shoulder stabilizing zone around a shoulder region of the occupant, thereby preventing forward rotation of the shoulder region, in response to a side impact collision.

In another implementation, the present disclosure is directed to an apparatus for restraining a vehicle occupant including a seat belt associated with a seat of a vehicle, a shoulder belt portion of the seat belt comprising a shoulder stabilizing zone and a thorax belt portion, the thorax belt portion for extending across an occupant's thorax, wherein the shoulder stabilizing zone includes a larger width dimension than the thorax belt portion, the shoulder stabilizing zone configured to spread across a shoulder region of the occupant. The apparatus further includes a lap belt portion of the seat belt for extending across a waist of the occupant, a lock portion associated with the lap belt portion and the shoulder belt portion of the seat belt, and a pretensioning device associated with the lap belt portion and the shoulder belt portion of the seat belt. The pretensioning device is configured to cinch and lock the shoulder stabilizing zone about the shoulder region of the occupant in order to substantially prevent rotation of the shoulder region, the lap belt portion about the pelvis of the occupant, and the thorax belt portion of the seat belt across the thorax of the occupant in response to a side impact collision.

BRIEF DESCRIPTION OF THE DRAWINGS

FIGS. 7A and 7B are schematic detailed and front views of the seat belt apparatus shown in FIGS. 5A and 5B.

FIG. 7C is a detailed illustration of a deployed integrated shoulder stabilizing airbag.

DETAILED DESCRIPTION OF THE DRAWINGS

The disclosure relates in general to a method, system and apparatus for stabilizing an occupant's shoulder during a side impact of a vehicle and, more particularly, to a method for stabilizing an occupant's shoulder during a side impact of a vehicle that limits shoulder rotation and resulting exposure of impact load path to the thorax and abdominal regions of the occupant.

The present method, system and apparatus is presented in several varying embodiments in the following description with reference to the Figures, in which like numbers represent the same or similar elements. References throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

The described features, structures, or characteristics of the disclosure may be combined in any suitable manner in one or more embodiments. In the following description, numerous specific details are recited to provide a thorough understanding of embodiments of the system. One skilled in the relevant art will recognize, however, that the system and method may both be practiced without one or more of the specific details, or with other methods, components, materials, and so forth. In other instances, well-known structures, materials, or operations are not shown or described in detail to avoid obscuring aspects of the disclosure.

Figure 1A:
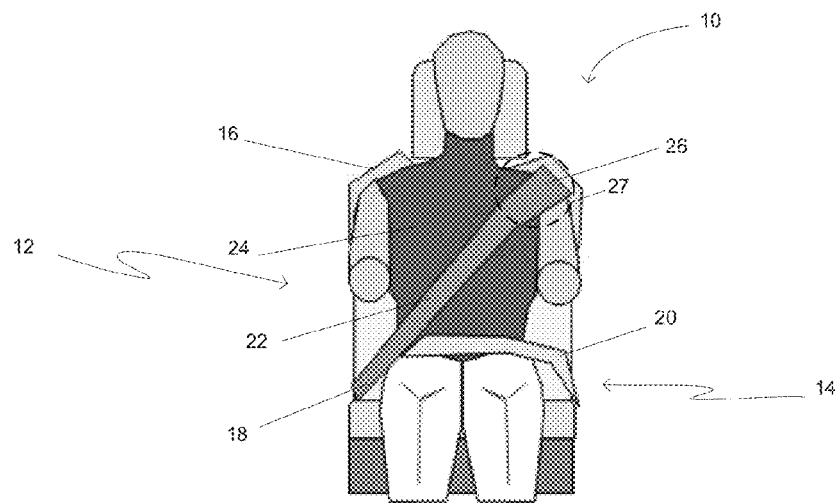
FIGS. 1A and 1B are schematic front and top elevation views of a seat belt apparatus for restraining a vehicle occupant illustrating the apparatus fit and appearance during normal operation of the seat belt, according to an embodiment.
Figure 1B:
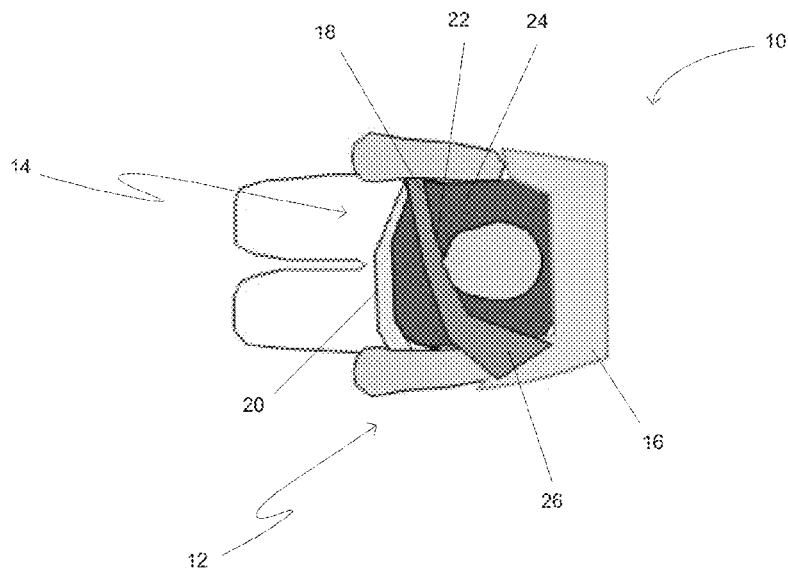
Figure 2A:
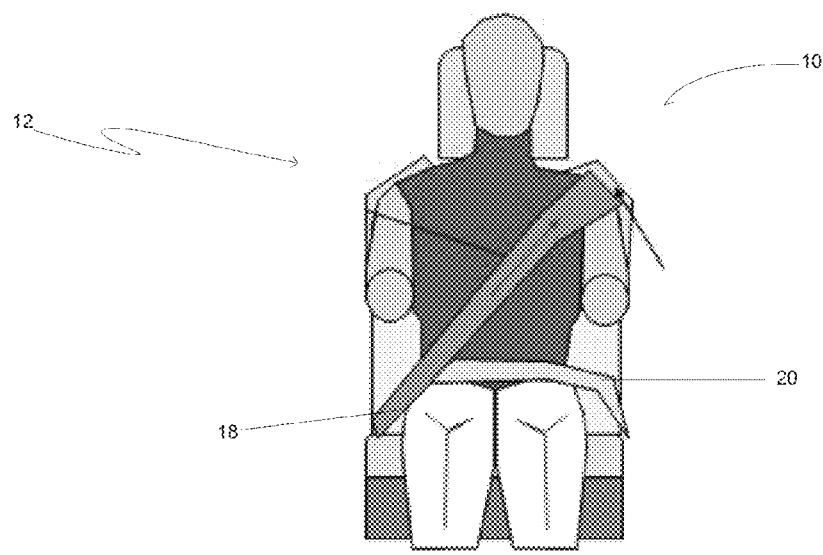
FIGS. 2A and 2B are schematic front and top elevation views of the seat belt apparatus shown in FIGS. 1A and 1B illustrating the cinching action of a pre-tensioner device of a shoulder stabilizing zone of the seat belt in response to detection of a side impact, according to an embodiment.
Figure 2B:
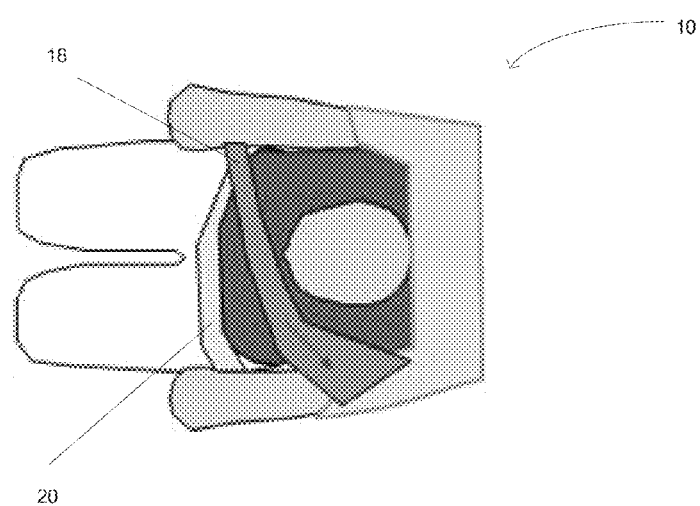

FIGS. 1A and 1B are front and top schematic illustrations of a seat belt apparatus 10 for restraining a vehicle occupant 12 under normal operation, according to an embodiment. FIG. 1A illustrates the fit and appearance of seat belt apparatus 10. The seat belt apparatus 10 includes a seat belt 14 associated with and/or attached to the seat 16 of a vehicle. The seat belt 14 includes a shoulder belt portion 18 and a lap belt portion 20. The shoulder belt portion 18 further includes a thorax belt portion 22 which extends substantially diagonally across the thorax 24 of the occupant 12 from the occupant's hip area to the occupant's shoulder. The shoulder belt portion 18 also includes a shoulder stabilizing zone 26.

As shown in FIG. 1B, the shoulder stabilizing zone 26 comprises a wide web shoulder region that fits tightly over the occupant's shoulder region (generally denoted at 27 in FIG. 1A), substantially in contact with front and top (and/or side) portions of occupant's shoulder and at least a front portion of the occupant's upper arm, according to an embodiment.

FIGS. 2A and 2B, and 3A and 3B are schematic front and top elevations, as well as detailed illustrations of the seat belt apparatus 10 shown in FIGS. 1A and 1B while under collision impact conditions, according to an embodiment. Generally, in response to a collision impact, the seat belt apparatus 10 activates pre-tensioning devices 30 and 34 (shown in FIGS. 3A and 3B) each of which respectively tightens (indicated by arrows in FIGS. 2A, 2B, 3A, and 3B) the shoulder belt portion 18 tightly around the occupant's thorax and shoulder region 27 and the lap belt portion 20 tightly across the lap and hips of the occupant 12.

Figure 3A:
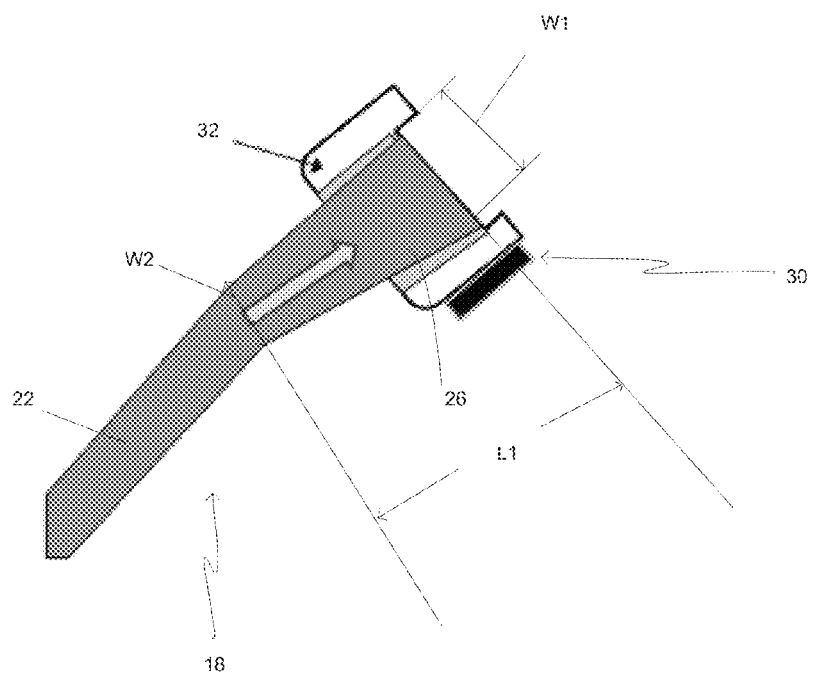
FIG. 3A is a schematic detailed illustration of a seat belt retractor including a pre-tensioner device and the shoulder stabilizing zone of the seat belt apparatus shown in FIGS. 1A, 1B, 2A, and 2B, according to an embodiment.
Figure 3B:
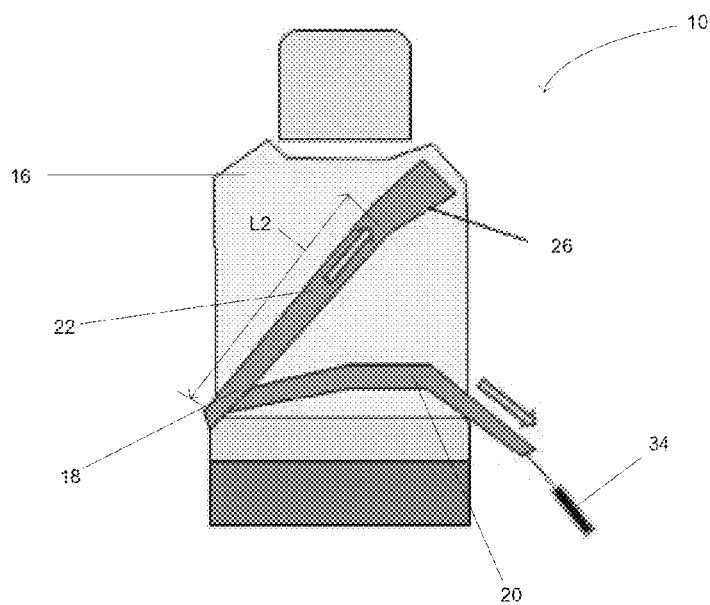
FIG. 3B is a schematic front view of the seat belt apparatus of FIGS. 1A, 1B, 2A, and 2B illustrating the seat belt apparatus including a retractor and pre-tensioner device, according to an embodiment.

More specifically, FIG. 3A illustrates details of the shoulder belt portion 18 including the thorax belt portion 22, the shoulder stabilizing zone 26, a retractor 32, and the pre-tensioning device 30 (mounted to a frame of the vehicle seat 16, as shown in FIG. 3B). As shown in FIGS. 3A and 3B, during a collision impact, the shoulder belt portion 18 attached to the vehicle seat 16 is spooled onto the retractor 32 by the activated pre-tensioning device 30.

Furthermore, as shown in FIG. 3A, the shoulder stabilizing zone 26 is generally wedge-shaped having its widest dimension W1 closest to the top of the shoulder, where a wide web of seat belt material is sized to spread across and restrain the occupant's shoulder region 27 during a collision impact. For example, the width of the intersection of the wide shoulder stabilizing zone 26 and the thorax belt portion of the shoulder belt portion of the seat belt includes a width dimension (at the top of the occupant's shoulder region) that may range in its width dimensions W1 from about 125 millimeter (mm) to about 250 mm. The width dimension W2 (as shown in FIG. 3A) of the base of the shoulder stabilizing zone 26 where the shoulder stabilizing zone 26 intersects the thorax belt portion 22 may range in its width dimensions W2 from about 45 mm to about 75 mm. The wide shoulder stabilizing area of the shoulder belt portion of the seat belt includes a length dimension (L1). The length L1 of the shoulder stabilizing zone 26 from the top of the shoulder area to the thorax belt portion 22 may range in its length L1 dimensions from about 200 mm to about 300 mm. Although illustrated in FIGS. 3A and 3B as dimensioned for an adult occupant, in other embodiments the seat belt apparatus 10 may be dimensioned for children and smaller individuals.

Although FIG. 3A illustrates the shoulder stabilizing zone 26 as a generally wedge-shape, in other embodiments the shoulder stabilizing area may be of other shapes, styles, or designs. For example, the shoulder stabilizing area may be substantially crescent, spherical, rectangular, polygonal, irregular, or of any other appropriate geometric shape sized to spread across and restrain the occupant's shoulder region 27 during a collision impact.

FIG. 3B illustrates a length L2 dimension of the thorax belt portion 22 of the seat belt apparatus 10. The length of the thorax belt portion 22 is sufficient to provide proper positioning of the thorax belt portion 22 across the occupant's chest as well as to properly position the attached shoulder stabilizing zone 26 around the occupant's shoulder region 27. For example, the length L2 dimension of the thorax belt portion from the lap belt portion 20 to the shoulder stabilizing zone 26 may range in its length L2 dimensions from about 500 mm to about 600 mm.

FIG. 3B illustrates a linear pre-tensioning device 34 for tightening of the lap belt portion 20 across the lap, hips, and pelvis region of occupant 12 (shown in FIGS. 2A and 2B), according to an embodiment. The pre-tensioning device 34 is mounted to the vehicle body (such as a b-pillar of the vehicle body). As described above, in response to a side collision impact, pre-tensioning device 30 will cinch the shoulder belt portion 18 including the thorax belt portion 22 and the shoulder stabilizing zone 26 tightly about the occupant 12. Similarly, in response to a side collision impact the body mounted linear pre-tensioning device 34 will cinch the lap belt portion 20 tightly about the occupant 12. The arrows of FIGS. 3A and 3B indicate the activated tightening direction of the seat belt apparatus 10 during a side collision impact.

Figure 4A:
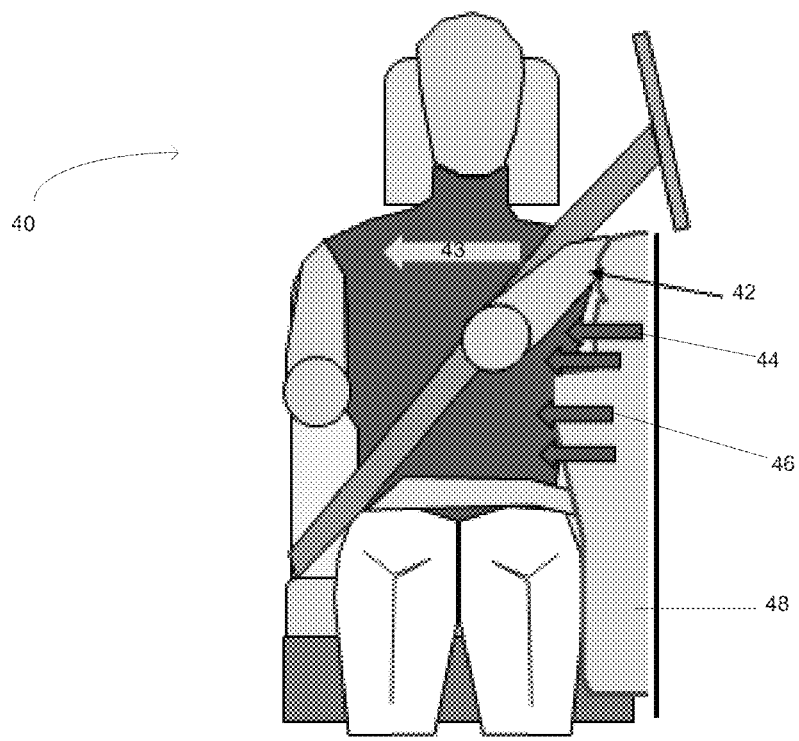
FIG. 4A is a schematic illustration of a conventional shoulder seat belt during a side impact which allows for the distribution of the crash load path from the should area to the exposed thorax and abdomen of an occupant.

FIG. 4A is a schematic illustration of a conventional shoulder seat belt 40 during a side collision impact. Although such conventional shoulder seat belts may be beneficial during frontal collisions, where they prevent forward movement and secure the occupant's torso against the seatback, they provide little support for stabilizing the occupant's shoulder and subsequently preserving the load path through the shoulder region during side collisions. For example, during a side collision impact, the occupant's shoulder rotates, causing the occupant's arm 42 to rotate away from the side collision impact. Thus, the occupant's arm 42 will elevate exposing the thorax and the abdomen to the intruding interior of the vehicle (shown in FIG. 4A). The load path 43 will consequently shift from the occupant's shoulder to the more exposed thorax 44 and abdomen 46 (as shown in FIG. 4A). As a result, less impact load is transferred through the shoulder and the occupant is not physically moved away from the intruding structure effectively. Thus, the occupant's vital organs are left well within the path of the intruding structure and are more likely to suffer thoracic or abdominal injuries.

Figure 4B:
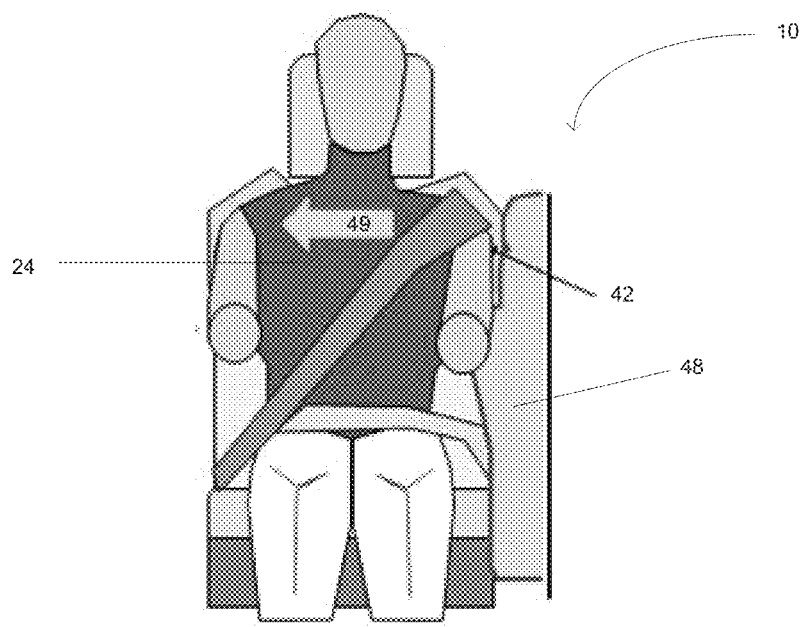
FIG. 4B is a schematic illustration of the seat belt apparatus of FIGS. 1A, 1B, 2A and 2B during a side impact which substantially prevents distribution of the crash load path from the shoulder area to the thorax and abdomen of an occupant, according to an embodiment.

In contrast, FIG. 4B illustrates an improved function of the seat belt apparatus 10 over the conventional seat belt 40 of FIG. 4A during a collision impact. The seat belt apparatus 10 substantially locks and restrains the occupant's shoulder region 27 in place so that it substantially maintains its load carrying capability during the collision impact and thereby reduces the risk of thorax and abdominal injuries. For example, by maintaining load carrying capabilities through the shoulder, the occupant's torso is effectively moved away from intruding structures caused by the impact. The seat belt apparatus 10 stabilizes the shoulder region 27 of the occupant 12, thereby preventing forward rotation of the shoulder and arm 42. Thus, as shown in FIG. 4B, the seat belt apparatus 10 allows for substantially more effective transfer of the side collision impact load path 49 through the shoulder resulting in effective movement of the occupant's upper torso/thorax 24 away from the intruding structure 48. The effective transfer of the side collision impact load path 49 is further effectuated by substantially maintaining a side impact collision load path to the shoulder region of the occupant 12 during contact with the interior of the vehicle by locking the pretensioning device in place. Such action also helps maintain the occupant's arm 42 between the occupant's thoracic 24 and abdominal regions and the intruding structure 48, therefore limiting exposure of the thoracic and abdominal regions and reducing the risk of subsequent injury.

Figure 5A:
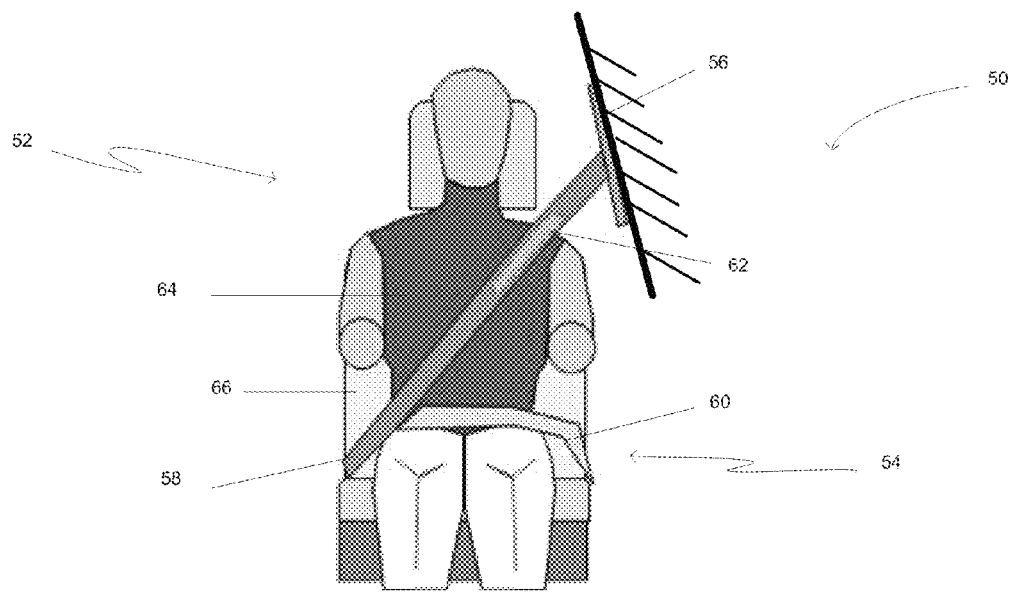
FIGS. 5A and 5B are schematic front and top elevation views of a seat belt apparatus for restraining a vehicle occupant illustrating the apparatus fit and appearance during normal operation of the seat belt, according to an embodiment.
Figure 5B:
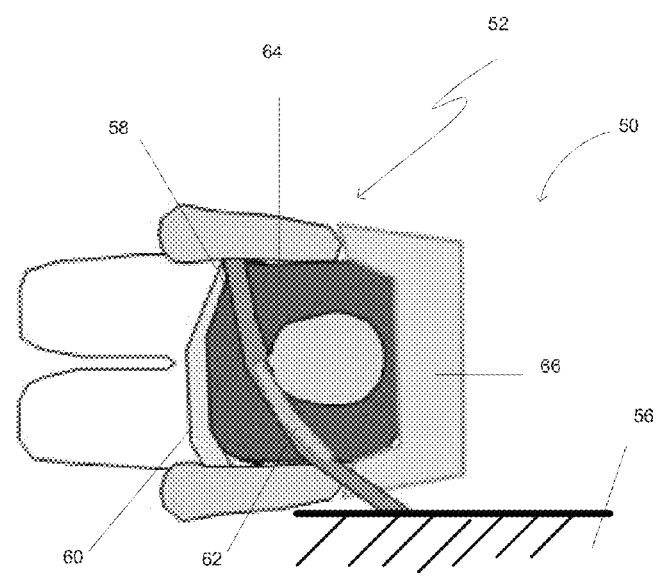

In another embodiment, FIGS. 5A and 5B are front and top schematic illustrations of a web integrated inflatable seat belt apparatus 50 for restraining a vehicle occupant 52 under normal operation, according to an embodiment. FIG. 5A illustrates the fit and appearance of the seat belt apparatus 50. The seat belt apparatus 50 includes a seat belt 54 associated with a seat 66 of a vehicle. The seat belt 54 includes a shoulder belt portion 58 and a lap belt portion 60. The shoulder belt portion 58 extends substantially diagonally across the thorax 64 of the occupant 52 from the occupant's hip area to the occupant's shoulder. The shoulder belt portion 58 also includes a web integrated inflatable cushion 62 woven into the seat belt 54 at an upper area of the shoulder belt portion 58 that is deployed in response to a collision impact.

FIGS. 6A and 6B, and 7A-C are schematic front and top elevations, as well as detailed illustrations of the seat belt apparatus 50 shown in FIGS. 5A and 5B while under collision impact conditions, according to an embodiment.

Figure 6A:
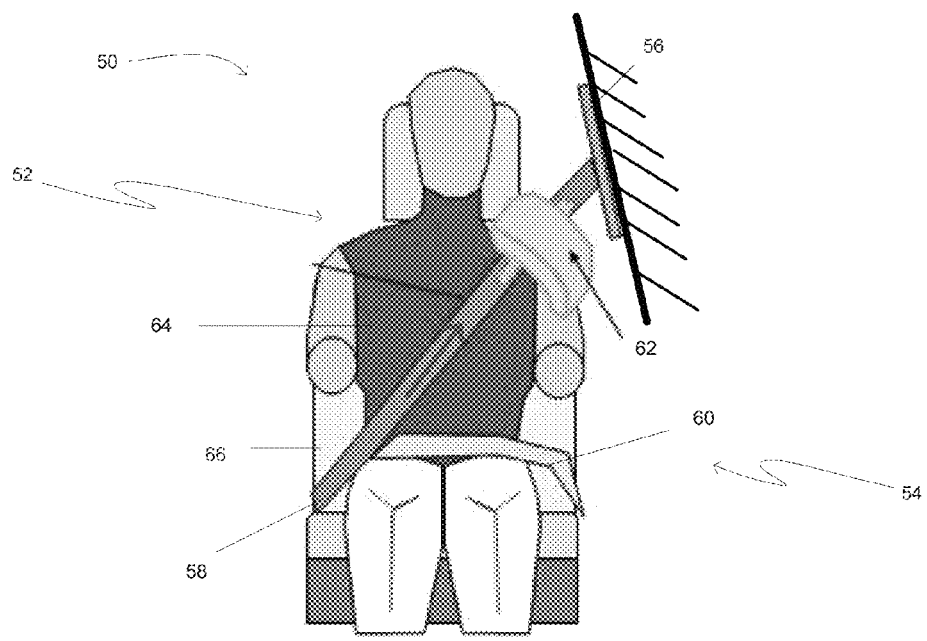
FIGS. 6A and 6B are schematic front and top elevation views of the seat belt apparatus shown in FIGS. 5A and 5B illustrating the deployment of an integrated shoulder stabilizing airbag of the seat belt in response to detection of a side impact, according to an embodiment.
Figure 6B:
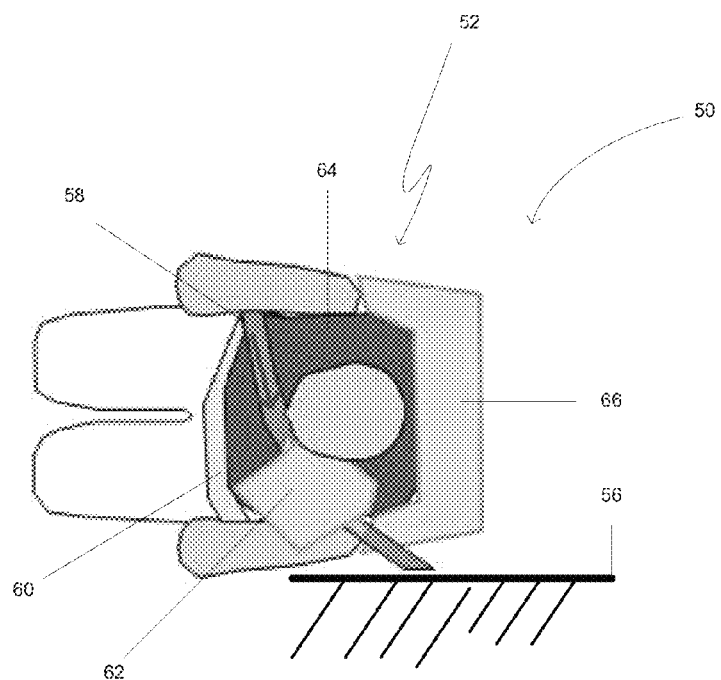

As shown in FIG. 6A, in response to a collision impact, the seat belt apparatus 50 activates pre-tensioning devices which tighten (indicated by arrows in FIGS. 6A and 6B) the shoulder belt portion 58 tightly around the occupant's thorax 64 and shoulder region and the lap belt portion 60 tightly across the lap and hips of the occupant 52.

Shown in more detail in FIGS. 7A and 7B, in response to a collision impact, the seat belt apparatus 50 activates linear type pre-tensioning devices 74 and 76 each of which respectively tightens (indicated by arrows in FIG. 7B) the shoulder belt portion 58 tightly around the occupant's thorax 64 and shoulder region 27 and the lap belt portion 60 tightly across the lap and hips of the occupant 52. Additionally, during collision and in response to impact a small cold gas or hybrid direct gas fill container 70 is activated by communication line 72 to deploy and inflate the web integrated inflatable cushion 62. In some embodiments, the integrated inflatable cushion 62 can be inflated using a cold gas inflator or a hybrid inflator, as described above, or a cold gas and pyrotechnic inflator, a pyrotechnic inflator, or a micro gas generator (MCG).

For example, in an embodiment when the seat belt apparatus 50 is worn by an occupant 52 during and in response to a collision impact the cushion 62 is automatically inflated spreading wide across the shoulder region 27 of the occupant 52. The inflated cushion 62 subsequently stabilizes and substantially locks the shoulder region 27 of the occupant 52 into place preventing forward rotation of the shoulder region 27 and maintaining the shoulder load path to effectively move the occupant away from intruding collision structure. In an embodiment, when the seat belt apparatus 50 is not worn by the occupant 52 or is used for the restraint of a child seat, the automatic inflation device is not activated.

As shown in FIGS. 7A-C, during a collision impact, the cushion 62 is inflated within the shoulder belt portion 58 and pulled tightly by a linear-type retractor and pre-tensioning device 68. FIG. 7A illustrates in more detail the shoulder belt portion 58 including the web integrated inflatable cushion 62, a cold gas or hybrid direct fill inflator 70 and inflator tubing 72.

FIG. 7A illustrates a length L1 dimension of the web integrated inflatable cushion 62 of the seat belt apparatus 50 before collision impact and cushion 62 inflation. For example, the length L1 dimension of the web integrated inflatable cushion 62 may range from about 250 mm to about 300 mm, and about 300 mm to about 250 mm, and in its width W1 dimensions from about 45 mm to about 74 mm.

FIG. 7B illustrates the linear retractor and pre-tensioning device 76 for tightening of the shoulder belt portion 58 across the thorax 64 and shoulder, and the locking retractor 74 configured and positioned to tension and tighten the lap belt 60 across the occupant's hip area, according to an embodiment. In an embodiment, both of these devices 74, 76 are mounted to the vehicle body (such as the b-pillar of the vehicle body).

As shown in FIG. 7C, the web integrated inflatable cushion 62, once inflated, is generally arch-shaped to enable snug fitting over and around the occupant's shoulder area having a width dimension W2. For example, the width of the fully inflated web integrated inflatable cushion 62 may range in its width dimension W2 from about 75 mm to about 350 mm, from about 100 mm to about 300 mm, and from about 150 mm to about 250 mm. In an embodiment, the width dimension W2 may be about 200 mm.

The length L2 of the fully inflated web integrated inflatable cushion 62 is sufficient to provide proper positioning of the inflated cushion 62 around the occupant's shoulder region 27 and to assist with preventing rotation of the shoulder region 27 away from any intruding side structure. For example, once fully inflated, the web integrated inflatable cushion 62 may range in its length dimension L2 from about 175 mm to about 550 mm, from about 200 mm to about 400 mm, and from about 300 mm to about 350 mm. In an embodiment, the length dimension L2 may be about 300 mm. In addition, in some embodiments, the depth of the fully inflated web integrated inflatable cushion 62 may range from about 50 mm to about 100 mm. Although illustrated in FIGS. 6A, 6B, and 7A-C as dimensioned for an adult occupant, in some embodiments the seat belt apparatus 50 may be dimensioned for children and smaller individuals. In other embodiments, the dimensions described above may be sufficient for children and smaller individuals using the seat belt as their primary restraint (in other words, using the seat belt apparatus 10 not in conjunction with a car seat).

Although 7C illustrates the web integrated inflatable cushion 62 as a generally arch-shape, in other embodiments the web integrated inflatable cushion may be of other shapes or designs. For example, the web integrated inflatable cushion may be substantially crescent, spherical, rectangular, polygonal, cube, irregular, or of any other appropriate geometric shape sized to spread across and restrain the occupant's shoulder region 27 during a collision impact. In addition, in an embodiment, the inflatable cushion 62 is constructed of a one-piece woven silicon-coated fabric with no venting so that pressure is maintained over an extended duration when inflated.

Figure 8A:
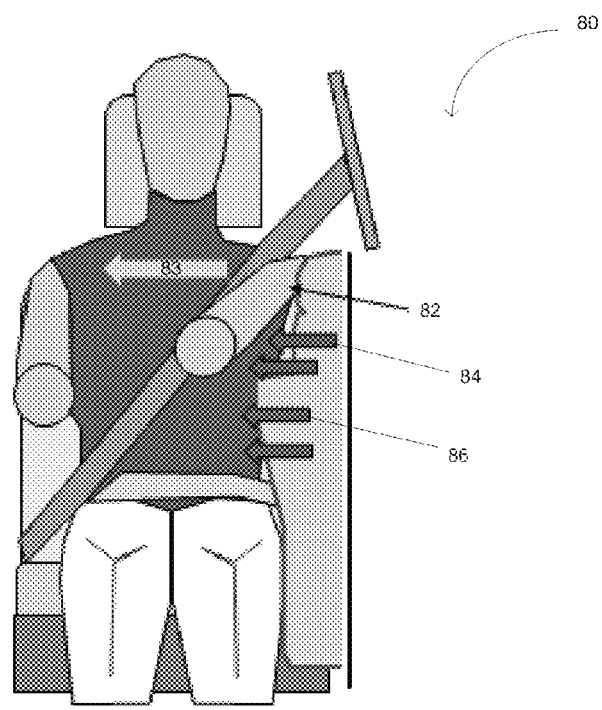
FIG. 8A is a schematic illustration of a conventional shoulder seat belt during a side impact which allows for the distribution of the crash load path from the should area to the exposed thorax and abdomen of an occupant.

Similar to that shown in FIG. 4A, FIG. 8A is a schematic illustration of a conventional shoulder seat belt 80 during a side collision impact. Although such conventional shoulder seat belts may be beneficial during frontal collisions, where they prevent forward movement and secure the occupant's torso against the seatback they provide little support for stabilizing the occupant's shoulder and subsequently preserving the load path through the shoulder region during side collisions. For example, during a side collision impact, the occupant's shoulder rotates, causing the occupant's arm 82 to rotate away from the side collision impact. Thus, the occupant's arm 82 will elevate exposing the thorax and the abdomen to the intruding interior of the vehicle (shown in FIG. 8A). The load path 83 will consequently shift from the occupant's shoulder to the more exposed thorax 84 and abdomen 86 (as shown in FIG. 8A). As a result, less impact load is transferred through the shoulder and the occupant is not physically moved away from the intruding structure effectively. Thus, the occupant's vital organs are left well within the path of the intruding structure and are more likely to suffer thoracic or abdominal injuries.

Figure 8B:
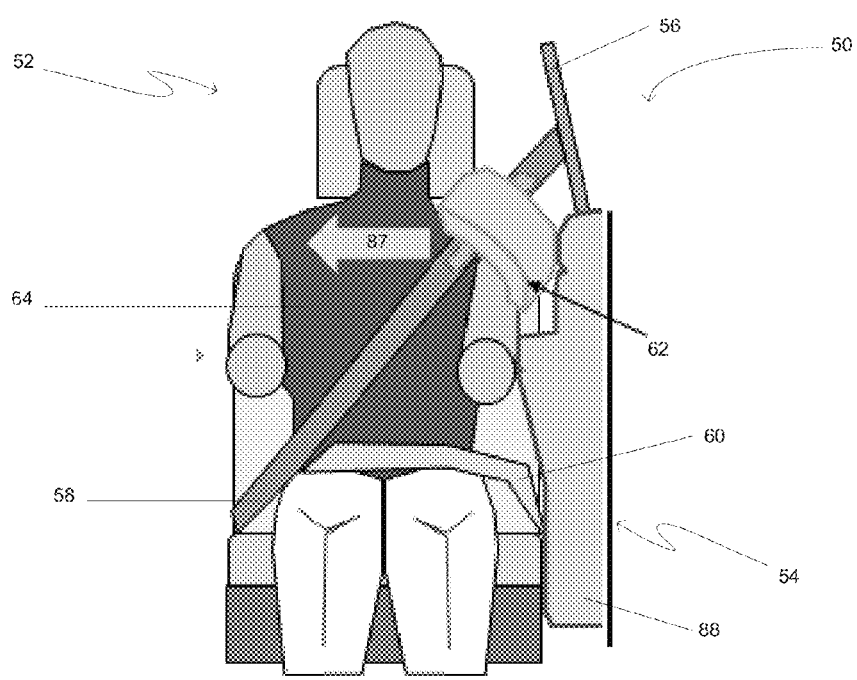
FIG. 8B is a schematic illustration of the seat belt apparatus of FIGS. 5A and 5B during a side impact which prevents distribution of the crash load path from the shoulder area to the thorax and abdomen of an occupant, according to an embodiment.

In contrast, FIG. 8B illustrates an improved function of the seat belt apparatus 50 over the conventional seat belt 80 of FIG. 8A during a collision impact. The seat belt apparatus 50 restrains the occupant's shoulder region 27 so that it maintains its load carrying capability during the collision impact and thereby reduces the risk of thorax and abdominal injuries. For example, by maintaining load carrying capabilities through the shoulder, the occupant's entire torso is effectively moved away from intruding structures caused by the impact. More specifically, the seat belt apparatus 50 stabilizes the shoulder region 27 of the occupant preventing forward rotation of the shoulder and arm. Thus, as shown in FIG. 8B, the seat belt apparatus 50 allows for transfer of the side collision impact load 87 through the shoulder resulting in effective movement of the occupant's upper torso/thorax 64 away from the intruding structure 88. Such action may prevent exposure of the occupant's thoracic 64 and abdominal regions to the intruding structure 88 and subsequent injury.

Although the present disclosure has been presented with respect to preferred embodiment(s), any person skilled in the art will recognize that changes may be made in form and detail, and equivalents may be substituted for elements of the disclosure without departing from the spirit and scope of the disclosure. Therefore, it is intended that the disclosure not be limited to the particular embodiments disclosed, but will include all embodiments falling within the scope of the appended claims.

What is claimed is:

1. A method of restraining an occupant on a vehicle seat comprising:
   providing a seat belt associated with the vehicle seat;
   activating a pretensioning device associated with a lap belt portion of the seat belt and a shoulder belt portion of the seat belt in response to a side impact collision, the shoulder belt portion of the seat belt including a wide shoulder stabilizing zone and a thorax belt portion, the wide shoulder stabilizing zone wider than the thorax belt portion and configured to fit over a shoulder region of the occupant and substantially be in contact with front and top portions of the shoulder region and at least a front portion of an upper arm of the occupant;
   preventing substantial forward rotation of the shoulder region of the occupant in response to the side impact collision by cinching the wide shoulder stabilizing zone of the seat belt about the shoulder region of the occupant with the activated pretensioning device; and
   locking the pretensioning device in place to prevent substantial motion of the shoulder region and a pelvis region of the occupant.

2. The method of restraining an occupant on a vehicle seat of claim 1, before locking the pretensioning device in place further comprising, tightening the lap belt portion of the seat belt about the pelvis region of the occupant.

3. The method of restraining an occupant on a vehicle seat of claim 1, further comprising substantially maintaining a side impact collision load path to the shoulder region of the occupant during contact with an interior of the vehicle by locking the pretensioning device in place.

4. The method of restraining an occupant on a vehicle seat of claim 1, wherein providing a seat belt comprises providing a seat belt attached to the vehicle seat.

5. The method of restraining an occupant on a vehicle seat of claim 1, wherein the wide shoulder stabilizing zone of the shoulder belt portion of the seat belt includes a width dimension ranging from about 125 millimeters to about 250 millimeters.

6. The method of restraining an occupant on a vehicle seat of claim 1, wherein the wide shoulder stabilizing zone of the shoulder belt portion of the seat belt includes a length dimension ranging from about 200 millimeters to about 300 millimeters.

7. The method of restraining an occupant on a vehicle seat of claim 1, wherein the thorax belt portion of the shoulder belt portion of the seat belt includes a width dimension ranging from about 45 millimeters to about 75 millimeters.

8. The method of restraining an occupant on a vehicle seat of claim 1, wherein the thorax belt portion of the shoulder belt portion of the seat belt includes a length dimension ranging from about 500 millimeters to about 600 millimeters.

9. An apparatus for restraining a vehicle occupant comprising:
   a seat belt associated with a seat of a vehicle;
   a shoulder belt portion of the seat belt comprising a shoulder stabilizing zone and a thorax belt portion, the thorax belt portion for extending across an occupant's thorax, wherein the shoulder stabilizing zone includes a larger width dimension than the thorax belt portion, the shoulder stabilizing zone configured to fit over a shoulder region of the occupant and substantially be in contact with front and top portions of the shoulder region and at least a front portion of an upper arm of the occupant;
   a lap belt portion of the seat belt for extending across a waist of the occupant; and
   a pretensioning device associated with the lap belt portion and the shoulder belt portion of the seat belt,
   the pretensioning device configured to cinch and lock;
   the shoulder stabilizing zone about the shoulder region of the occupant in order to substantially prevent rotation of the shoulder region in response to a side impact collision;
   the lap belt portion about a pelvis region of the occupant; and
   the thorax belt portion of the seat belt across the thorax of the occupant in response to the side impact collision.

10. The apparatus for restraining a vehicle occupant of claim 9, wherein the shoulder stabilizing zone of the shoulder belt portion of the seat belt includes a width dimension ranging from about 125 millimeters to about 250 millimeters.

11. The apparatus for restraining a vehicle occupant of claim 9, wherein the shoulder stabilizing zone of the shoulder belt portion of the seat belt includes a length dimension ranging from about 200 millimeters to about 300 millimeters.

12. The apparatus for restraining a vehicle occupant of claim 9, wherein the thorax belt portion of the shoulder belt portion of the seat belt includes a width dimension ranging from about 45 millimeters to about 75 millimeters.

13. The apparatus for restraining a vehicle occupant of claim 9, wherein the thorax belt portion of the shoulder belt portion of the seat belt includes a length dimension ranging from about 500 millimeters to about 600 millimeters.

* * * * *